(12) United States Patent
Dargis

(10) Patent No.: US 8,590,031 B2
(45) Date of Patent: *Nov. 19, 2013

(54) METHODS, SYSTEMS, AND COMPUTER PROGRAM PRODUCTS FOR ACCESS CONTROL SERVICES USING A TRANSPARENT FIREWALL IN CONJUNCTION WITH AN AUTHENTICATION SERVER

(75) Inventor: Anthony B. Dargis, Flemington, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/640,468

(22) Filed: Dec. 17, 2009

(65) Prior Publication Data
US 2011/0154468 A1    Jun. 23, 2011

(51) Int. Cl.
*G06F 21/00*    (2013.01)
(52) U.S. Cl.
USPC ............ 726/11; 726/12; 726/13; 726/14; 726/15; 713/153; 713/154; 709/238; 709/239; 709/240; 709/241; 709/242; 709/243; 709/244; 705/79; 370/351; 370/352; 370/353; 370/354; 370/355; 370/356; 370/357; 370/358; 370/359; 370/360; 370/430
(58) Field of Classification Search
USPC ............ 726/11; 370/351–430; 713/153, 154; 705/79
See application file for complete search history.

(56) References Cited

U.S. PATENT DOCUMENTS

| | | | |
|---|---|---|---|
| 5,623,601 A * | 4/1997 | Vu | 726/12 |
| 6,230,271 B1 | 5/2001 | Wadlow et al. | |
| 6,404,870 B1 * | 6/2002 | Kia et al. | 379/144.01 |
| 6,463,474 B1 | 10/2002 | Fuh et al. | |
| 6,845,452 B1 * | 1/2005 | Roddy et al. | 726/11 |
| 6,854,063 B1 | 2/2005 | Qu et al. | |
| 7,099,947 B1 * | 8/2006 | Nadeau et al. | 709/229 |
| 7,359,883 B2 * | 4/2008 | Namba et al. | 705/59 |
| 7,366,894 B1 * | 4/2008 | Kalimuthu et al. | 713/153 |
| 2003/0154399 A1 * | 8/2003 | Zuk et al. | 713/201 |
| 2004/0268145 A1 * | 12/2004 | Watkins et al. | 713/201 |
| 2005/0147084 A1 * | 7/2005 | Zhang et al. | 370/352 |
| 2005/0165834 A1 * | 7/2005 | Nadeau et al. | 707/103 R |
| 2005/0243798 A1 * | 11/2005 | Dunn et al. | 370/352 |

(Continued)

FOREIGN PATENT DOCUMENTS

EP    0713311 A1 *    5/1996

OTHER PUBLICATIONS

Blumenthal et al., "User-based Security Model (USM) for version 3 of the Simple Network Management Protocol (SNMPv3)", Request for Comments 3414, Dec. 2002, 89 pgs.

*Primary Examiner* — Andy Rao
*Assistant Examiner* — Shan Elahi
(74) *Attorney, Agent, or Firm* — Myers Bigel Sibley & Sajovec

(57) ABSTRACT

Access control methods include receiving an access authorization message from an authentication server computer at a blocking device that connects a first network to a second network, modifying access criteria of a transparent firewall at the blocking device responsive to the received access authorization message and operating the transparent firewall according to the modified access criteria to control transfer of messages between the first and second networks. The invention may also be implemented as apparatus and computer readable media.

19 Claims, 3 Drawing Sheets

(56) References Cited

U.S. PATENT DOCUMENTS

| | | |
|---|---|---|
| 2005/0286510 A1 | 12/2005 | Nakajima et al. |
| 2006/0265586 A1 | 11/2006 | Transy et al. |
| 2007/0186273 A1 | 8/2007 | Carpy et al. |
| 2007/0256122 A1* | 11/2007 | Foo et al. ............... 726/5 |
| 2007/0271453 A1* | 11/2007 | Pohja et al. ............ 713/153 |
| 2007/0277228 A1 | 11/2007 | Curtis et al. |
| 2007/0283419 A1 | 12/2007 | Afergan et al. |
| 2008/0072304 A1 | 3/2008 | Jennings et al. |
| 2008/0162926 A1 | 7/2008 | Xiong et al. |
| 2008/0195861 A1 | 8/2008 | Salomone |
| 2008/0216160 A1 | 9/2008 | Rollet |
| 2009/0083830 A1 | 3/2009 | Lum et al. |
| 2009/0119754 A1 | 5/2009 | Schubert |
| 2009/0144807 A1 | 6/2009 | Zheng |
| 2009/0254973 A1 | 10/2009 | Kwan |
| 2010/0005506 A1 | 1/2010 | Lum |
| 2011/0107410 A1* | 5/2011 | Dargis ............... 726/9 |

* cited by examiner

METHODS, SYSTEMS, AND COMPUTER PROGRAM PRODUCTS FOR ACCESS CONTROL SERVICES USING A TRANSPARENT FIREWALL IN CONJUNCTION WITH AN AUTHENTICATION SERVER

CROSS-REFERENCE TO RELATED APPLICATIONS

The present application is related to U.S. patent application Ser. No. 12/610,411, filed Nov. 2, 2009, entitled "METHODS, SYSTEMS, AND COMPUTER PROGRAM PRODUCTS FOR CONTROLLING SERVER ACCESS USING AN AUTHENTICATION SERVER," and U.S. patent application Ser. No. 12/640,528, filed Dec. 17, 2009, entitled "Methods, Systems, and Computer Program Products for Access Control Services Using Source Port Filtering," the disclosures of which are hereby incorporated herein by reference.

BACKGROUND OF THE INVENTION

The present application relates generally to computer networks and, more particularly, to methods, systems and computer program products for controlling network access.

Private networks, such as networks used by businesses and other entities, are typically connected to public networks, such as the Internet, as such private networks may include servers that provide various retail or other e-commerce services to Internet users. Such internet-connected networks are often subject to attack from unauthorized users. Such attacks may compromise confidential information or consume server resources.

A variety of techniques have been devised for protecting such devices. For example, a device protecting a network may maintain a "whitelist" of internet addresses that are allowed to access the server. However, such whitelists may need to be updated (often manually) as users move from one location to another. Other techniques for protection include "port knocking," in which a coded sequence of TCP (transmission control protocol) SYN (synchronize) requests to specific ports to authenticate a user, and "single packet authorization" (SPA), in which a specially coded packet authenticates a user and data.

Some access control techniques involve the use of firewalls. Typical firewall devices inspect and filter traffic before making a decision on what to do with a packet. They commonly have two interfaces, an internal interface and an external interface. The external interface may communicate with a router connected to the Internet, while the internal interface may communicate with a local router or private network. Packets received at the external interface are generally passed or rejected according to criteria associated with the firewall. For authorized packets, the firewall typically performs network address translation (NAT) and routes the modified authorized packets towards their destinations. A "transparent" firewall foregoes such routing operations by filtering at the data link layer instead of the network layer, acting like a network bridge rather than a router. Transparent firewalls are also referred to as in-line, shadow, stealth or bridging firewalls.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Some embodiments of the present invention provide network access control methods comprising receiving an access authorization message at a blocking device that connects a first network to a second network. Access criteria of a transparent firewall at the blocking device are modified responsive to the received access authorization message. The transparent firewall responsively operates according to the modified access criteria to control transfer of messages between the first and second networks.

The access authorization message may be received over the first network. The access authorization message may identify an authorized source address, and modifying access criteria of the transparent firewall may include modifying the access criteria to allow passage of messages from and/or to the authorized source address. The access authorization message may further identify an authorized type of traffic from the authorized source address and modifying access criteria of the transparent firewall may include modifying the access criteria to allow the authorized type of traffic from and/or to the authorized address. Modifying access criteria of the transparent firewall responsive to the received access authorization message may include modifying an access control list (ACL) based on the access authorization message.

The access authorization message may include a secure access authorization message. For example, the secure access authorization message may include a Simple Network Management Protocol version 3 (SNMPv3) message. The access authorization message may be addressed to an address assigned to the transparent firewall.

In further embodiments, receiving an access authorization message may be preceded by receiving an access request message at an authentication server computer. The access request message may be authenticated at the authentication server computer and, responsive to authentication of the access request message, the access authorization message may be transmitted from the authentication server computer to the blocking device.

The present invention may be also be embodied as apparatus and computer-readable medium configured to provide the above-described operations. For example, in some embodiments, an apparatus includes a network interface circuit configured to send and receives messages over first and second networks and a transparent firewall circuit coupled to the network interface circuit and configured to receive an access authorization message, to modify access criteria based on the received access authorization message and to control transmission of messages between the first and second networks based on the modified access criteria.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
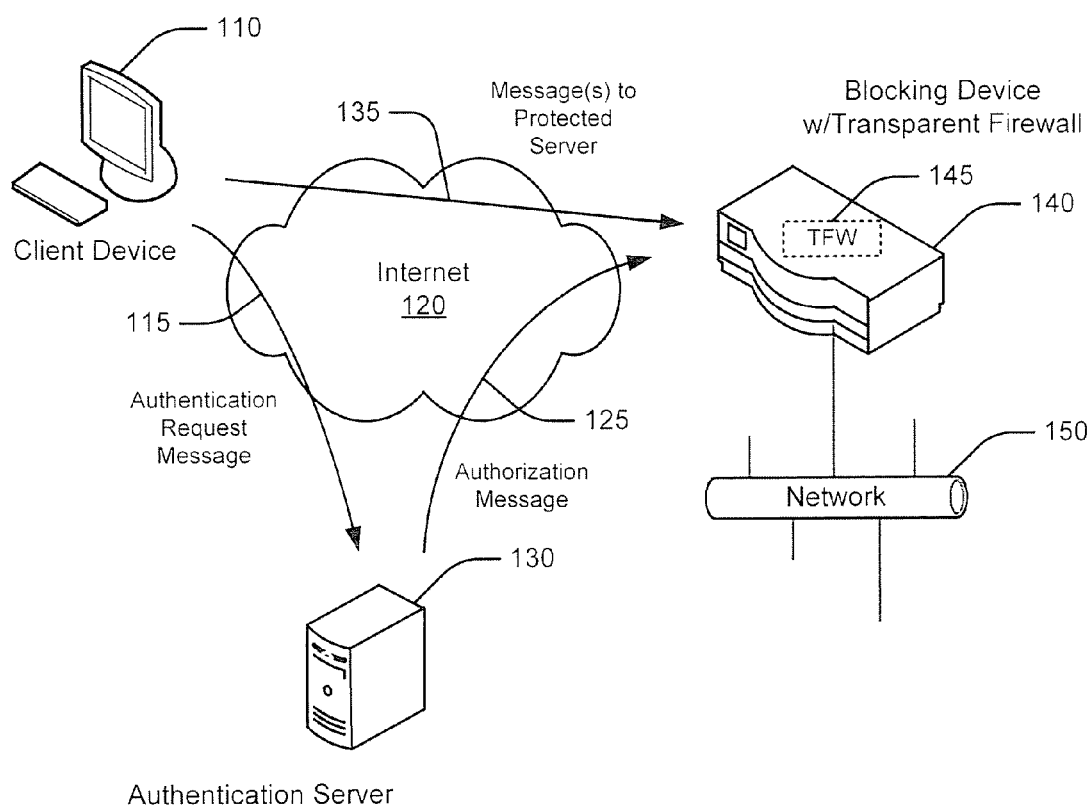
FIG. 1 is a block diagram illustrating systems and methods for managing a transparent firewall for network access in accordance with some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations discussed herein may be written in a high-level programming language, such as Java, C, and/or C++, for development convenience. In addition, computer program code for carrying out operations according to some embodiments may also be written in other programming languages, such as, but not limited to interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Embodiments are described hereinafter with reference to flowchart and/or block diagram illustrations of methods, systems, client devices, and/or computer program products in accordance with some embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing, the functions specified in the flowchart and/or block diagram block or blocks.

FIG. 1 illustrates access control systems and methods according to some embodiments of the present invention. A private network 150 is protected by a blocking device 140 configured to provide a transparent firewall 145. The transparent firewall 145 generally controls traffic between the private network 150 and a public internet 120 based on access criteria that may, for example, allow only packets from authorized network (e.g., IP) addresses to pass to the network 150 from the internet 120. An authentication server 130 is configured to authenticate requests for access to the protected network 150 and to provide access authorization information to the transparent firewall 145 which may responsively modify the access criteria applied by the transparent firewall 145, es . . . , criteria as to the source/destination and/or types of messages to be allowed to pass through the transparent firewall 145. This can reduce or prevent attacks against the protected network 150, such as scanning, denial of service and spoofing attacks.

The network 150 may be, for example, a private network of a customer subscribing to protection services provided by a vendor operating the authentication server 130. The use of the transparent firewall 145 in conjunction with the authentication server 130 can provide a compelling service offering for the customer, as the use of the transparent firewall 145 generally does not require reconfiguration of the customer's network and, thus, allows relatively simple implementation of an access control service. Provision of access authorization information from the authentication server 130 may only require assignment of an IP address to the blocking device for purposes of communicating the access criteria. The blocking device 140 may be a device located, for example, at a customer's premises equipment or a device controlled by a network provider that provides access to the internet 120. The latter configuration may be advantageous for network providers, as it can retain control of security features in the network provider's infrastructure.

The authentication server 130 may receive an authentication request message 115 from a client device 110 over, for example, the internet 120. The access request message 115 may, for example, identify the client device 110, and may request access to the protected network 150 via the blocking device 140. In response to receipt of the access request message 115, the authentication server 130 authenticates the access request message 115, e.g., verifies that the client device 110 is authorized to access the protected network 150. In response to the authentication, the authentication server 130 may send an access authorization message 125 to the transparent firewall 145 at the blocking device 140, which may responsively modify its security configuration, for example, its access control list (ACL), to allow authorized messages 135 from the authorized client device 110 to pass to the network 150. The access authorization message 125 may be, for example, a single Simple Network Management Protocol version 3 (SNMPv3) message that supports authentication, message integrity and encryption of the management payload. The access authorization message 125 may be encrypted and time-stamped to reduce or prevent eavesdropping and replay attacks.

The authentication server 130 may be, for example, a secure socket layer (SSL) enabled web server. Depending on security requirements, examples of authentication processes that may be used include processes involving one-time use of a security token, processes using an ID with password or pass-phrase, processes using, a user-entered ID and/or processes using an ID included in an http request string. The authentication server 130 may be configured to handle requests for multiple protected servers and/or networks, and may scale based on the number of servers/networks protected.

The blocking device 140 may be any of a number of different types of network devices, for example, a router with an application blade or a Linux server. In some embodiments, the network 150 may be a network of a customer of a vendor that operates the authentication server 130. As a service to the customer, the vendor may provide the blocking device 140 to control access to the customer's network 150, which may also have its own internal security structure. The blocking device 140 may, for example, block all traffic that is not specifically authorized by its ACL, while also listening for SNMPv3 access authorization messages 125 from the authentication server 130.

The access authorization messages 125 may, for example, identify IP addresses for messages that are to be allowed to pass through the transparent firewall 145. According to further embodiments, the access authorization messages may provide additional screening information, for example, information specifying the types of message traffic to be allowed, such as traffic conforming to selected protocols (TCP, UDP, ICMP, ESP, etc.). In still further embodiments, more selective access authorization information may be provided, such as information identifying particular ports or ranges of ports.

Figure 2:
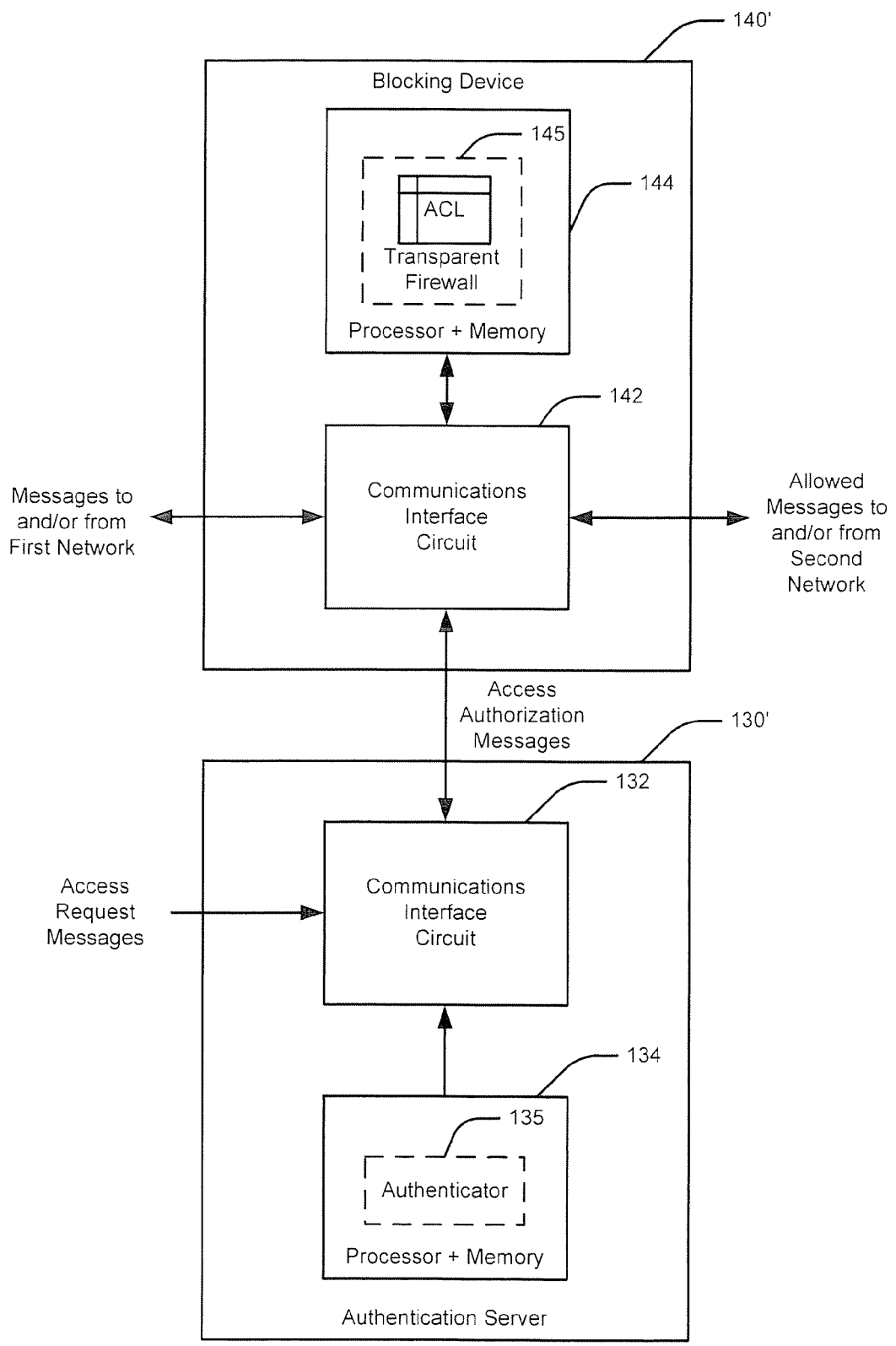
FIG. 2 is a block diagram illustrating an authentication server and blocking device in accordance with some embodiments.

FIG. 2 illustrates implementation of an authentication server 130' and a blocking device 140' configured to provide a transparent firewall 145 according to some embodiments. The authentication server 130' comprises a computer device including a processor and associated memory (internal and/or external) 134, which is configured to send and receive messages via a communications interface circuit 132. Access request messages received via the communications interface circuit 132 are authenticated by an authenticator circuit 134, here shown as implemented using program code 135 that is executed by the processor and memory combination 134. The authenticator circuit 134 may, for example, examine identification information in the received access request messages and may responsively generate access authorization messages that are transmitted to the blocking device 140' via the communications interface circuit 132.

The blocking device 140' may be computer device that includes a processor and associated memory 144 which is communicatively coupled to a communications interface circuit 142. The communications interface circuit 142 is configured to receive access authorization messages from the authentication server 130'. As illustrated, the processor and memory 144 is configured to provide a transparent firewall 145 that maintains an ACL based on the received access authorization messages. The communications interface circuit 142 is further configured to receive messages from client devices that are addressed to a server/network protected by the blocking device 140'. The transparent firewall 145 controls transmission of the received messages on to the protected server based on the ACL.

Figure 3:
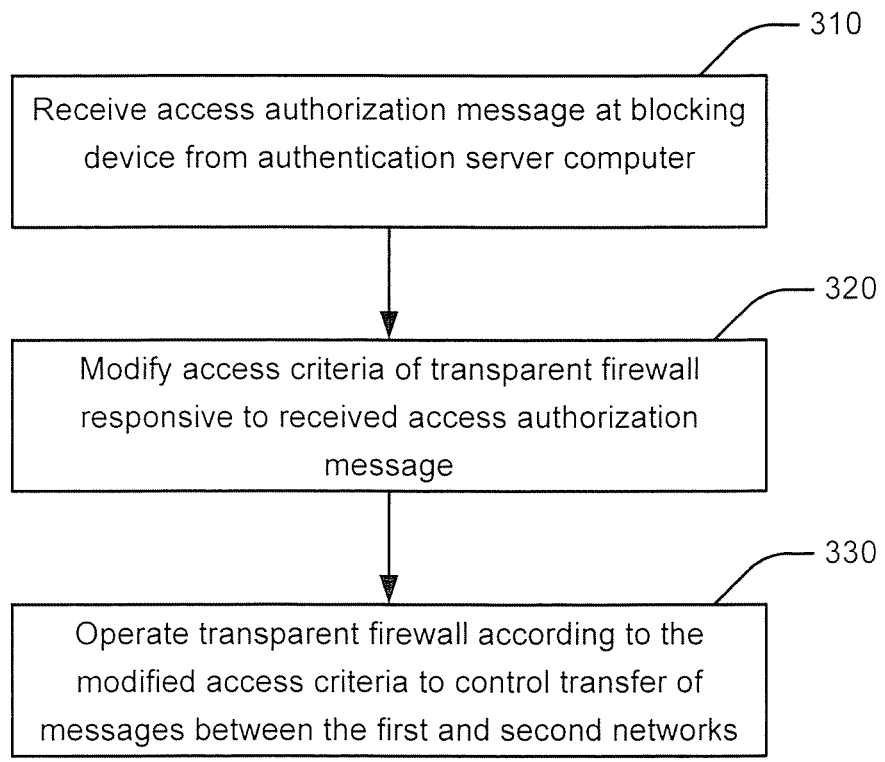
FIG. 3 is a flowchart that illustrates operations methods, systems, and computer program products in accordance with some embodiments.

FIG. 3 illustrates operations for controlling access to a protected server according to some embodiments. An access authorization message is received at a blocking device from an authentication server (block 310). Access criteria applied by a transparent firewall at the blocking device are modified responsive to the received access authorization message (block 320). The transparent firewall responsively operates based on the modified access criteria (block 330).

Potential advantages in some embodiments may include allowing the blocking device to be invisible to messages other than those from authorized addresses and messages from the authentication server. Even if the authentication credentials become compromised, the existing security structure of the protected server can detect unauthorized intrusion, and the intrusion's visibility may be enhanced by the filtering effect of the blocking device, which can reduce significantly lower the number of intrusions actually reaching the protected server. Authentication can be moved to the network and performed on a device (the authentication server) that is optimized for the function.

In some embodiments, performance may be enhanced by limiting the number of potential source addresses that may be accepted by a blocking device, as an ACL with an overly large number of authorized source addresses may present performance issues. It may also be desirable to limit the number of applications and hosts, as sites that run multiple applications and/or hosts may be more vulnerable to attack and/or misconfiguration.

Many variations and modifications can be made to the embodiments without substantially departing from the principles of the present invention. All such variations and modifications are intended to be included herein within the scope of the present invention, as set forth in the following claims.

That which is claimed:

1. A network access control method comprising:
   receiving an access authorization message at a blocking device, from an authentication server computer, separate from the blocking device, that connects a first network to a second network;
   modifying access criteria of a transparent firewall at the blocking device responsive to receiving the access authorization message to provide modified access criteria; and
   operating the transparent firewall according to the modified access criteria to control transfer of messages between the first and second networks,
   wherein the access authorization message further identifies an authorized type of traffic from an authorized source address, the authorized type of traffic being traffic conforming to a specific protocol; and
   wherein the receiving, the modifying and the operating are performed on at least one processor.

2. The method of claim 1, wherein the receiving an access authorization message comprises receiving the access authorization message over the first network.

3. The method of claim 1:
   wherein the access authorization message identifies the authorized source address; and
   wherein the modifying access criteria of the transparent firewall comprises modifying the access criteria to allow passage of messages from and to the authorized source address.

4. The method of claim 3:
   wherein the modifying access criteria of the transparent firewall comprises modifying the access criteria to allow the authorized type of traffic from and to the authorized address.

5. The method of claim 1, wherein the modifying access criteria of the transparent firewall responsive to the access authorization message comprises modifying an access control list based on the access authorization message.

6. The method of claim 1, wherein the access authorization message comprises a secure access authorization message.

7. The method of claim 6, wherein the secure access authorization message comprises a Simple Network Management Protocol version 3 message.

8. The method of claim 1, wherein the access authorization message is addressed to an address assigned to the transparent firewall.

9. The method of claim 1, wherein the first network comprises a public internet and wherein the second network comprises a private network.

10. The method of claim 1, wherein the receiving an access authorization message is preceded by:
    receiving an access request message at the authentication server computer;
    authenticating the access request message at the authentication server computer; and
    responsive to authenticating the access request message, transmitting the access authorization message from the authentication server computer to the blocking device.

11. An apparatus, comprising:
    a network interface circuit to send and receive messages over first and second networks; and
    a transparent firewall circuit coupled to the network interface circuit and configured to receive an access authorization message, from an authentication server, separate from the transparent firewall circuit, to modify access criteria based on the access authorization message to provide modified access criteria and to control transmission of messages between the first and second networks based on the modified access criteria,
    wherein the access authorization message identifies an authorized type of traffic from an authorized source address, the authorized type of traffic being traffic conforming to a specific protocol.

12. The apparatus of claim 11, wherein the network interface circuit is to receive the access authorization message over the first network and to convey the access authorization message to the transparent firewall circuit.

13. The apparatus of claim 11:
    wherein the access authorization message identifies the authorized source address; and
    wherein the transparent firewall circuit is to modify the access criteria to allow passage of messages between the authorized source address and the second network.

14. The apparatus of claim 13:
    wherein the transparent firewall circuit is to modify the access criteria to allow the authorized type of traffic from and to the authorized address.

15. The apparatus of claim 11, wherein the transparent firewall circuit is to modify an access control list based on the access authorization message.

16. The apparatus of claim 11, wherein the access authorization message comprises a secure access authorization message.

17. The apparatus of claim 6, wherein the secure access authorization message comprises a Simple Network Management Protocol version 3 message.

18. The apparatus of claim 11, wherein the access authorization message is addressed to an address assigned to the transparent firewall.

19. The method of claim 1, wherein the specific type of protocol comprises one of transmission control protocol, user datagram protocol, Internet control message protocol and encapsulating security protocol.

* * * * *

UNITED STATES PATENT AND TRADEMARK OFFICE
CERTIFICATE OF CORRECTION

PATENT NO. : 8,590,031 B2
APPLICATION NO. : 12/640468
DATED : November 19, 2013
INVENTOR(S) : Dargis Page 1 of 1

It is certified that error appears in the above-identified patent and that said Letters Patent is hereby corrected as shown below:

In the Claims:
Column 8, Claim 11, Line 16: Please correct "and configured to receive"
to read -- and to receive --

Signed and Sealed this
Twenty-second Day of April, 2014

Michelle K. Lee
*Deputy Director of the United States Patent and Trademark Office*